Figure 1:
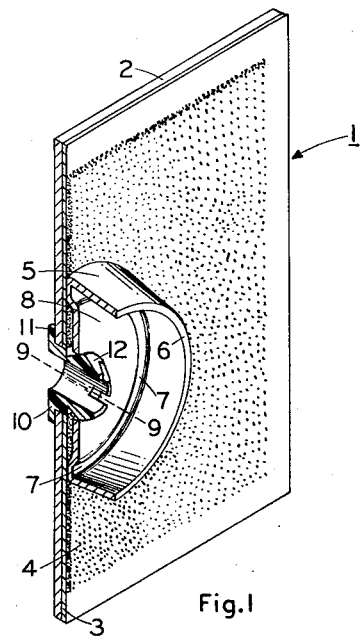

Sept. 24, 1957  J. R. THURELL, JR  2,807,761
CURRENT RECTIFIER ASSEMBLY
Filed Feb. 7, 1956

Inventor:
John R. Thurell Jr.
by. Richard E. Horley
His Attorney

United States Patent Office 2,807,761
Patented Sept. 24, 1957

2,807,761

CURRENT RECTIFIER ASSEMBLY

John R. Thurell, Jr., Peabody, Mass., assignor to General Electric Company, a corporation of New York Application February 7, 1956, Serial No. 563,975

9 Claims. (Cl. 317—234)

The present invention relates to dry plate current rectifier assemblies and, in one aspect, to improved contacting and spacing of individual rectifier cells which are assembled into stacks.

In the heretofore conventional construction of rectifier stacks, such as assemblies of selenium rectifier cells, the individual cells are plates have each been provided with a central aperture permitting mounting on an insulating tube. For the purpose of establishing electrical contact with rather delicate counter-electrode surfaces, compressible and flexible petal washers have also been stacked upon the insulating tube, at appropriate positions, and relatively wide spacer washers have been interposed between adjacent cells to provide cell spacings which enable proper cell heat dissipations to be realized. Electrical connector elements have also been disposed at required positions in the stack, and the entire assembly has been bolted or otherwise compressed together to form a unit which is electrically and mechanically sound.

The aforementioned petal washers have generally taken the form of slightly convex disks of a flexible conducting metal radially slotted to produce resilient legs or "petals" which are intended to maintain pressurized electrical connection with cell counterelectrodes at all times despite dimensional changes due to temperature variations. Like radial slotting for resilient contacting purposes has been employed with elements serving both a contacting and spacing function, as is disclosed in U. S. Patent 2,712,102 for "Dry Plate Rectifier Assembly and Contact Spring Therefor," assigned to the same assignee as that of the present invention.

It has been found that in some stack constructions wherein exposed surfaces must be heavily coated with protective paint films the paint tends to collect in ridges about the portions of the flexible contacting elements which engage the cell surfaces. Where slotted elements are employed, the paint collects in this manner on inner surfaces as well, and naturally coats the cell wherever the slots leave areas exposed. Accordingly, when the resilient legs of the contacting elements flex in radial directions under influence of temperature-induced dimensional changes, they tend to ride up onto the insulating paint ridges and sever or unduly increase the resistance of the electrical connections which they should maintain. A similar disadvantage accrues when individual cells or plates rotate about their support tube and orient the paint once deposited through the slots such that it lies between surfaces which should be in electrical contact.

Assembly of rectifier cells into stacks cannot only be a tedious and costly operation where numerous components are used but can also be exacting in that soft-alloy counterelectrodes may be damaged easily by improper fitting of cells upon insulating tube and of contacts with the cell surfaces. These considerations are of particular importance where individual components are to be stocked and assembled into stacks of various types as occasion demands.

Thus, one of the objects of my invention is to provide improved rectifiers of the foregoing character which are inexpensive and simple to assemble and in which requisite electrical contacts are preserved.

Further, it is an object to provide current rectifiers wherein novel and improved cell assemblies each include a contact and spacer member independently secured to a rectifier cell by way of an insulating cell-mounting element.

In one practice of these teachings, common selenium rectifier cells are employed, such cells having a center-apertured conducting baseplate upon which are deposited one or more layers of selenium, with a counterelectrode alloy overlying the selenium. Each of the cells is associated with an inflexible electrical contact member which is in the form of a hollow truncated right cone, the base of which is essentially closed except for a small central aperture of about the same size as the cell apertures. The base portion of each contact member includes an outermost annular ridge or edge near the periphery thereof, with the remainder of the base being recessed toward the inside of the member. In its association with a rectifier cell, the annular ridge portion of a contact member is engaged with the cell counterelectrode and the opposite edge of the contact member is disposed for engagement with the uncoated side of the baseplate of an adjacent cell. Height of the truncated right conical contact member establishes the cell spacing without requirement for a further spacer element. The base angle for the contact members is selected such that, for a given height, the centers of the annular base ridge and opposite edge are aligned. In stacked formations including a plurality of cells, this alignment results in freedom of the cells from bending forces, as is more fully described hereinafter. In addition, each contact member is fastened to its associated rectifier cell by way of a separate hollow tubular insulator which passes through the central apertures of the cell and contact member base and locks the base and cell baseplate together. These cell and contact member units are then stacked in any desired number upon a bolt, without need for further tubular insulators, and a pressurized washer or other spring element is added to the bolt before a lock nut is drawn up to clamp the cells in a fully fastened relationship.

Figure 2:
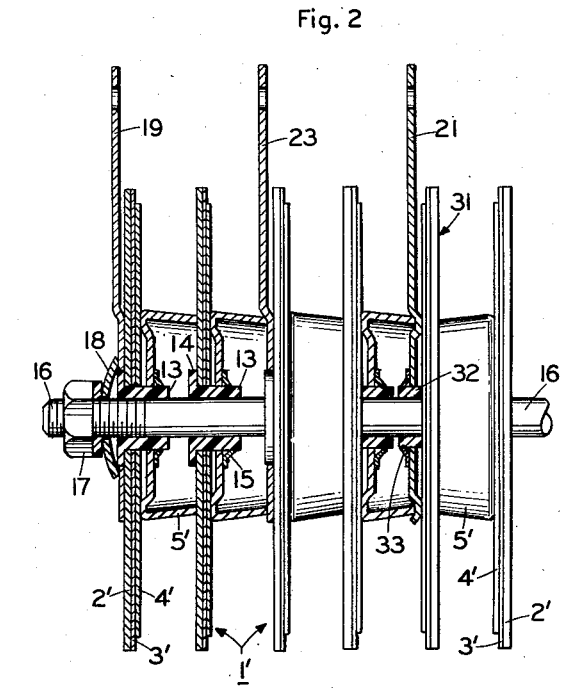
Figure 3:
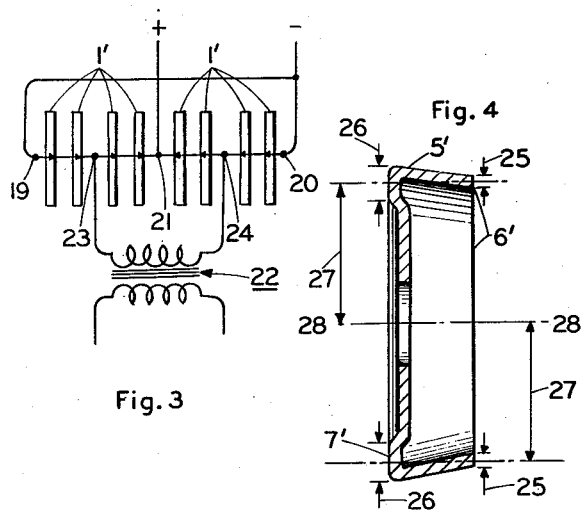
Figure 4:
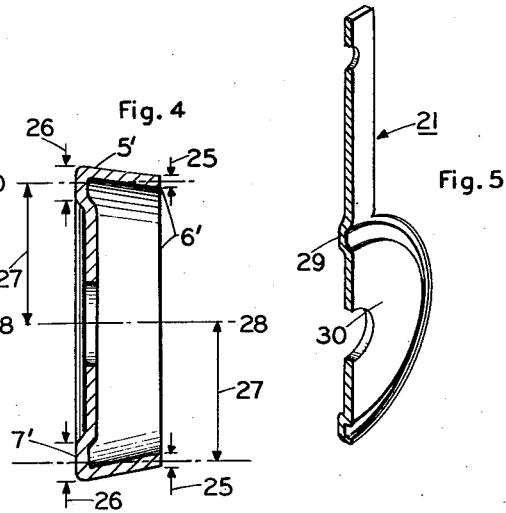
Figure 5:
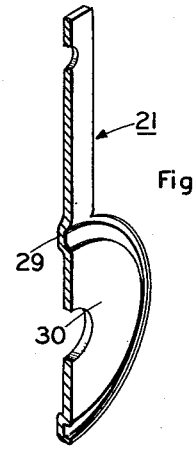

The subject matter regarded as my invention is particularly pointed out and distinctly claimed in the concluding portion of this specification. However, both as to organization and method of operation, and further in relation to objects and advantages thereof, this invention may best be understood by reference to the following description taken in connection with the accompanying drawing, in which:

Figure 1 is a pictorial view, partly in cross-section of a rectifier cell and contact unit to which teachings of this invention are applied;

Figure 2 provides a partial side view, with portions cross-sectioned, of a rectifier stack including a plurality of cells;

Figure 3 presents a schematic circuit diagram of a complete rectifier assembly, such as that of Figure 2, with circuit input and output connections;

Figure 4 details in cross-section a preferred form of rectifier contact and spacer member; and Figure 5 depicts in a pictorial and partly cross-sectioned view a preferred electrical connector which may be utilized with rectifier stacks in which these teachings are practiced.

The embodying unit portrayed in Figure 1 includes a rectifier cell or plate 1 wherein a relatively thin center-apertured conducting baseplate 2 is coated with at least one selenium layer 3 and the selenium, in turn, has a metal counterelectrode 4 deposited thereon. In abutting relationship with the counterelectrode surface there is a hollow cup-shaped contact and spacer member 5 which may be conveniently pressed into the illustrated configuration from sheet stock. The end of member 5 which abuts the counterelectrode is closed except for a central aperture of about the same size as the circular central aperture through cell 1, and the opposite end is left open, defined only by the narrow annular rim or edge 6. The closed end or base of member 5 is essentially in two portions: one portion is the outer annular ridge 7, which is flattened on the side engaging the counterelectrode 4; and the other of which is the central support portion 8 somewhat recessed in relation to ridge 7 such that it does not engage the cell counterelectrode. Ridge 7 is parallel with edge 6, and is unbroken by any slots or other irregularities, and while portion 8 is likewise shown uninterrupted, it may be radially slotted or otherwise formed as a somewhat flexible web. The ridge or contact portion 7 is disposed close to the periphery of the member 5 such that, when in frictional engagement with counterelectrode 4, there will be maximum opposition to undesired torques which may tend to turn the cell about its central axis 9—9. Support portion 8 is preferably kept out of contact with the counterelectrode surface because shorting is avoided and self-healing of localized shorts between the baseplate and counterelectrode is more likely to take place where the counterelectrode is not under pressure engagement with the contact member. Thus, by limiting the contact to the surfaces of outer ridge 7, a lower contact pressure will suffice to prevent the aforesaid cell turning and as minimum a contact area may be involved as is commensurate with the needed low contact resistance.

Contact member 5 and cell 1 are fastened together as a unit by a centrally-disposed hollow insulating tube or bushing 10. This bushing is axially short and does not extend beyond the rim 6 of the contact member in the depicted assembled relationship. Between its ends, bushing 10 is provided with an intermediate section having an outer diameter complementing the diameter of the central aperture in cell 1, which enables the cell to be centered on the bushing. On one end adjoining the intermediate section there is disposed an integral flange 11, abutting the uncoated side of cell baseplate 2, and the opposite end, 12, is enlarged and provided with longitudinal slots permitting radial flexing of the material at that end. Assembly is accomplished by passing bushing end 12 through the cell aperture until the cell is seated against flange 11, and contact and spacer member 5 is pressed over bushing end 12 until it is forced into and held in position against the counterelectrode 4. Enlarged end 12 is shaped such that its diameter at one axial position is greater than that of the central aperture in member 5 and such that its diameter gradually reduces in a direction toward the intermediate section and to a value less than that of this central aperture. Further, the axial position of the bushing diameter which is about the same as that of the aperture in member 5 is selected to appear where the member 5 will jam or lock in a desired pressurized engagement with the cell counterelectrode. Obviously, the bushing 10 may be turned around and inserted in the opposite direction, such that flange 11 rests against base portion 8 of member 5 and such that the enlarged bushing end 12 binds with baseplate 2.

A number of cell-contact-spacer-bushing units, such as that portrayed in Figure 1, may be assembled into a stack by mounting them upon an uninsulated bolt or shaft and locking them in an axially-aligned relationship. One such stack appears in the fragmentary side view of Figure 2, with components like those of the unit in Figure 1 bearing the same reference characters having prime accents. The central bushings 13 in the cell unit constructions are there somewhat different in that the outer diameter of each bushing is uniform except for one end flange 14. Desired locking and pressure are insured by lock nuts 15 which resist axial movement in one direction when pressed over the narrower bushing ends. As may be seen, the insulating bushings 13 are of such lengths in relation to their associated contact and spacer members 5' that bushings of adjoining cell units do not prevent the open ends of the contact members 5' from contacting the uncoated sides of baseplates 2' when the cells are stacked on the through bolt 16. A nut 17 fastens the cell units together on bolt 16, although obviously another form of locking member could be employed. Stack pressure may be controlled by addition of a spring washer 18 to the assembly, and such a resilient element may be of the type which exerts varying axial forces depending upon the temperature, whereby the effects of temperature-induced dimensional changes in stack parts may be offset.

In Figure 3 one form of schematic circuit connections for a stack such as that of Figure 2 is presented, the arrangement being that of a full wave bridge type rectifier stack. It should be evident that the entire stack is divided into four sections, each including two similarly disposed and serially connected rectifier cells. The end connectors 19 and 20 are coupled together to constitute one direct current terminal, and the central connector 21 constitutes the other direct current terminal. Alternating current is applied, as through transformer 22, to a pair of electrical connectors 23 and 24 disposed midway between the direct current connector members.

The slight taper or bevelled shape of the side walls of the contact and spacer members 5' is introduced for the purpose of minimizing bending forces which may be imposed upon rectifier cells by these members. Figure 4 details the desired constructional features, and it is first noted that the flattened contact portion 7', which engages the counterelectrode of one cell, is parallel with the opposite rim or end 6' which engages the uncoated side of the baseplate of an adjoining cell. The thickness 25 of the rim 6' may be less than the width 26 of the flattened annular contact portion 7' because the uncoated sides of the baseplates cannot be easily injured by relatively sharp edges and pressure concentrations on rim 25, and thus the entire member 5' may conveniently be formed from thin sheet stock. However, it is highly desirable that the forces exerted by one contact member on one side of a cell be aligned with the opposing forces imposed by another contact member on the other side of that cell, such that bending and stressing of the relatively thin baseplate will be avoided. Accordingly, each of members 5' is shaped such that the median radius of its contact portion 7' and the radius of its opposite end 6' are the same. Thus, in Figure 4, there is one radial distance, 27, at which these elements lie from the central axis 28—28 of the truncated right conical member 5'.

While the electrical connectors 19 and 23 in Figure 2 may be essentially flat because they engage only the uncoated sides of cell baseplates, the electrical connector 21 (Figures 2 and 5) is preferably provided with an annular ridge 29 and recessed web portion 30 of shape and dimensions like those of the bases of contact members 5'. This construction is desirable because connector 21 abuts and is electrically connected with the rather delicate counterelectrode surface of a cell 31, the stack construction requiring that the counterelectrodes of two cells be disposed toward one another. Cell 31 is therefore coupled with connector 21, as a unit, by way of a separate insulating bushing 32 and lock nut 33, in the manner of the unitary construction of the other cells with the contact members 5'.

The completed stack shown in Figure 2 may be sprayed or dipped to produce a protective film of paint or lacquer, or may be encapsulated with a potting resin. With the construction described, there is no relative motion experienced between cells and contact members, and such insulating materials thus cannot become interposed between the contact members and cells to disturb electrical continuity. The non-flexing constructions in fact enable the individual cell units to be painted separately, inside and out, with the edges 6 or 6′ and appropriate portions of the uncoated side of the baseplates masked so that the suitable contact surfaces will be exposed when stacks are assembled at later times.

Although the present invention has been described with reference to certain preferred forms of rectifier structures, it should be apparent to those skilled in the art that my teachings may be practiced with modifications, alterations, and substitutions yet without departure in spirit or scope from the invention as set forth in the appended claims.

What I claim as new and desire to secure by Letters Patent of the United States is:

1. Current rectifier apparatus comprising at least one apertured rectifier cell having a flat conducting baseplate with rectifying material deposited on one side thereof and an electrically conducting counterelectrode overlying said rectifying material, an inflexible electrical contact and spacer member hollow in cross section and having one open end and another parallel end thereof closed except for a central aperture therethrough, said closed end of said member including an outer contact portion near the periphery thereof aligned with said open end and an inner portion about said aperture recessed away from said contact portion toward the interior of said member, and a tubular insulator disposed through the apertures of said cell and member and mounting said member with said contact portion in abutting electrical contact with said counterelectrode.

2. Current rectifier apparatus comprising at least one apertured rectifier cell having a flat conducting baseplate with rectifying material deposited on one side thereof and an electrically conducting counterelectrode overlying said rectifying material, an inflexible hollow cup-shaped contact and spacer member having one open end and another parallel end closed except for a central aperture therethrough, said closed end of said member including an annular contact portion near the periphery thereof aligned with said open end and an inner portion about said aperture recessed away from said annular contact portion toward the interior of said cup-shaped member, and a tubular insulator disposed through the apertures of said cell and member and mounting said member with said annular contact portion in abutting electrical contact with said counterelectrode.

3. Current rectifier apparatus comprising at least one apertured rectifier cell having a flat conducting baseplate with rectifying material deposited on one side thereof and an electrically conducting counterelectrode overlying said rectifying material, an inflexible hollow contact and spacer member having the shape of a truncated right cone with the smaller end open and the larger parallel end closed except for a central aperture therethrough, said closed end of said member including an annular contact portion near the periphery thereof at a median radius from the axis of said truncated right conical member which is the same as the radius of said open end from said axis and further including an inner portion about said aperture recessed away from said annular contact portion toward the interior of said member, and a tubular insulator disposed through the apertures of said cell and member and mounting said member with said annular contact portion in contact with said counterelectrode.

4. Current rectifier apparatus comprising at least one apertured rectifier cell having a flat conducting baseplate with rectifying material deposited on one side thereof and an electrically conducting counterelectrode overlying said rectifying material, an electrical contact and spacer member hollow in cross section and having one open end and another parallel end thereof closed except for a central aperture therethrough, said closed end of said member including an outer contact portion near the periphery thereof and an inner portion about said aperture recessed away from said contact portion toward the interior of said member, a short tubular insulator disposed through the apertures of said cell and member in a locked engagement with said cell and member maintaining said contact portion of said member in abutting electrical contact with said counterelectrode, said tubular insulator extending into said member for a distance no greater than the distance between said parallel ends.

5. Current rectifier apparatus comprising at least one apertured rectifier cell having a flat conducting baseplate with rectifying material deposited on one side thereof and an electrically conducting counterelectrode overlying said rectifying material, an electrical contact and spacer member hollow in cross section and having one open end and another parallel end thereof closed except for a central aperture therethrough, said closed end of said member including an outer contact portion near the periphery thereof and an inner portion about said aperture recessed away from said contact portion toward the interior of said member, and fastening means locking said baseplate and said inner portion of said member together with said contact portion in pressure engagement with said counterelectrode, said fastening means including a short tubular insulator disposed through said apertures and extending into said member for a distance no greater than the distance between said parallel ends.

6. Current rectifier apparatus comprising at least one apertured rectifier cell having a flat conducting baseplate with rectifying material deposited on one side thereof and an electrically conducting counterelectrode overlying said rectifying material, and inflexible hollow contact and spacer member having the shape of a truncated right cone with the smaller end open and the larger parallel end closed except for a central aperture therethrough, said closed end of said member including an annular contact portion near the periphery thereof at a median radius from the axis of said truncated right conical member which is the same as the radius of said open end from said axis and further including an inner portion about said aperture recessed away from said annular contact portion toward the interior of said member, and fastening means locking said baseplate and said inner portion of said member together with said contact portion in pressure engagement with said counter-electrode, said fastening means including a short tubular insulator disposed through said apertures and extending into said member for a distance no greater than the distance between said parallel ends.

7. Current rectifier apparatus comprising a plurality of apertured rectifier cells each having a flat conducting baseplate with rectifying material deposited on one side thereof and an electrically conducting counterelectrode overlying said rectifying material, a plurality of inflexible electrical contact and spacer members each hollow in cross section and having one open end and another parallel end thereof closed except for a central aperture therethrough, said closed end of each member including an outer contact portion near the periphery thereof aligned with said open end and an inner portion about said aperture recessed away from said contact portion toward the interior of said member, hollow tubular insulating means disposed through the apertures of said cells and members and mounting said members with the contact portions thereof each in abutting electrical contact with a different counterelectrode of said cells, and means locking said cells and members together under pressure with said apertures in axial alignment.

8. Current rectifier apparatus comprising a plurality of apertured rectifier cells each having a flat conducting base-plate with rectifying material deposited on one side thereof and an electrically conducting counterelectrode overlying said rectifying material, a plurality of inflexible electrical contact and spacer members each hollow in cross section and having one open end and another parallel end thereof closed except for a central aperture therethrough, said closed end of each member including an outer contact portion near the periphery thereof aligned with said open end and an inner portion about said aperture recessed away from said contact portion toward the interior of said member, a plurality of fastening means each locking a different cell base-plate with the inner portion of a different contact and spacer member such that said contact portions of said members are in pressure engagement with said cell counterelectrodes, each of said fastening means including a short tubular insulator disposed through said apertures and extending into one of said members for a distance no greater than the distance between the parallel ends thereof, a support shaft disposed through said tubular insulators and maintaining said cells in alignment, and means on said shaft retaining said cells and members compressed together on said shaft.

9. Current rectifier apparatus comprising a plurality of flat parallel rectifier cells having aligned apertures therethrough, a plurality of inflexible hollow cup-shaped members each disposed between a pair of said cells, each of said cup-shaped members having one open end and another parallel end closed except for an aperture therethrough, said closed end of each member including an annular contact portion near the periphery thereof aligned with the open end thereof and an inner portion about said aperture recessed away from said contact portion toward the interior of said member, a plurality of short tubular insulators each disposed through the apertures of one cell and one cup-shaped member and mounting said cell and member with the contact portion of said member in engagement with the counterelectrode of said cell, a support shaft disposed through said tubular insulators and maintaining said cells and members in alignment, and means on said shaft retaining said cells and members compressed together on said shaft.

References Cited in the file of this patent

UNITED STATES PATENTS

| | | |
|---|---|---|
| 2,702,359 | Woodward | Feb. 15, 1955 |
| 2,712,102 | Bacon | June 28, 1955 |